US008105646B2

(12) United States Patent
Dody et al.

(10) Patent No.: US 8,105,646 B2
(45) Date of Patent: Jan. 31, 2012

(54) METHOD FOR PROMOTING SOIL CRUST FORMATION

(75) Inventors: Avraham Dody, Metar (IL); Eli Zaady, Midreshet Sde Boker (IL)

(73) Assignee: Nuclear Research Center-Negev, Beer Sheva (IL)

( * ) Notice: Subject to any disclaimer, the term of this patent is extended or adjusted under 35 U.S.C. 154(b) by 1078 days.

(21) Appl. No.: 11/920,066

(22) PCT Filed: May 4, 2006

(86) PCT No.: PCT/IL2006/000534
§ 371 (c)(1),
(2), (4) Date: Dec. 7, 2007

(87) PCT Pub. No.: WO2006/120672
PCT Pub. Date: Nov. 16, 2006

(65) Prior Publication Data
US 2009/0056214 A1    Mar. 5, 2009

(30) Foreign Application Priority Data

May 10, 2005  (IL) ......................................... 168527

(51) Int. Cl.
*B05D 5/00* (2006.01)
*C09K 17/00* (2006.01)
(52) U.S. Cl. ................ 427/136; 47/58.1 SC; 47/1.01 F; 111/118; 427/180
(58) Field of Classification Search .................. 106/900; 111/118; 427/236, 136, 180; 71/1, 6, 11, 71/23, 64.01–64.13, 903; 47/58.1 SC, 1.01 F
See application file for complete search history.

(56) References Cited

U.S. PATENT DOCUMENTS

| | | | |
|---|---|---|---|
| 3,969,844 A | | 7/1976 | Fogel et al. |
| 4,649,110 A | * | 3/1987 | Shilo et al. .................... 435/71.2 |
| 4,774,186 A | * | 9/1988 | Schaefer et al. ........... 435/257.1 |
| 5,090,843 A | | 2/1992 | Grigsby |
| 5,441,877 A | * | 8/1995 | Chiaffredo et al. ........... 435/176 |
| 5,522,985 A | * | 6/1996 | Bender et al. ................. 210/150 |
| 6,228,136 B1 | * | 5/2001 | Riley et al. ........................... 71/6 |
| 2001/0001634 A1 | | 5/2001 | Gamliel et al. |
| 2002/0001508 A1 | * | 1/2002 | Scott et al. ................. 405/128.7 |
| 2004/0228895 A1 | | 11/2004 | Tsror et al. |

FOREIGN PATENT DOCUMENTS

| | | | |
|---|---|---|---|
| CN | 1736159 A | * | 2/2006 |
| ES | 2073714 T3 | | 8/1995 |
| WO | WO 90/14222 A1 | | 11/1990 |
| WO | WO 01/24630 A1 | | 4/2001 |
| WO | 02088031 | | 11/2002 |

OTHER PUBLICATIONS

Kade et al., "Soil and Plant Recovery After Historic Military Disturbances in the Sonoran Desert, USA," Arid Land Research and Managment, vol. 16, Issue 3, 2002, pp. 231-243 (Abstract).*
Martinez et al., "Small-scale patterns of abundance of mosses and lichens forming biological soil crusts in two semi-arid gypsum environments," Australian Journal of Botany, 2006, 54, 339-348.*
Zaady, E. et al.: "Patterns . . . soil crust of successional age"; Soil Biol. Biochem. 32 (2000) 959-66.
Mazor G. et al.: "The role of cynobacterial . . . "; FEMS Microbiology Ecology 21 (1996) 121-30.
Belnap J. and Gardner J.S.: "Soil microstructure . . . "; Great Basin Naturalist 53 (1993) 40-7.
Zaady, E. et al.: "The germination . . . "; Plant and Soil 190 (1997) 247-52.
Chen et al.: "Man-made desert . . . "; Journal of Arid Environments 67 (2006) 521-27.
Belnap J.: "The potential roles . . . hydrologic cycles"; Hydrol. Process 20 3159-78 (2006).
Zaady E. and Bouskila A.: "Lizard burrows ... arid sandy region"; J. Arid Environ. 50 (2002) 235-46.
Johansen J.R: "Cryptogamic crusts . . . "; Journal of Phycology 29 (1993) 140-7.
Zaady et al.: "Microphtic soil . . . "; Amer. J. Botany 81 (1994) 109.
Dody A., Zaady E., Hasson A, 2006. Using biological soil crust as a top layer of radioactive waste disposal site. The 23rd Conference of the Nuclear Societies in Israel.
Dody A., Zaady E., 2006. How to reduce leaching of heavy metals from waste disposal sites. Israel Geological Society meeting. Bet Shean.
Dody A., Zaady E., Hasson a, 2006. Using biological soil crust as a top layer of radioactive waste disposal site. WM symposia, Tucson. AZ.
St. Clair et al.: "Rapid stabilization . . . "; Recla. Reveget. Res 4 (1986) 261-9.
Metting: Biolgocial surface features of semiarid land and deserts. In Skujins, J. (ed.), Semiarid lands and deserts, Soil resource and reclamation, Marcel Decker Inc. New York (1991) pp. 257-293.
Zaady et al.: "Patters of CO2 exchange . . . "; Soil Biol. Biochem 32 (2000) 956-66.

(Continued)

*Primary Examiner* — William Phillip Fletcher, III
(74) *Attorney, Agent, or Firm* — Roach, Brown, McCarthy & Gruber, P.C.; Kevin D. McCarthy

(57) ABSTRACT

An environmentally friendly method is provided for supporting the formation of microfloral soil crust, particularly in disturbed or contaminated areas, by treating soil with suspension containing microfloral propagules collected with runoff water on undisturbed sites. The method reduces spreading of contaminations from afflicted areas. Also provided is a composition of microfloral propagules for supporting the soil crust formation, which composition is in the form of suspension or powder.

25 Claims, 3 Drawing Sheets

OTHER PUBLICATIONS

Rubio et al.: "The effect of polyacrylamide . . . "; J. Range Management 45 (1992) 296-300.

Bowker et al.: "Prioritizing Conservation . . . "; Conservation Biology, vol , No. , (2008) 11 pages.

Offer et al.: "Aeolian Particle . . . ": Arid Soil Research and Rehabilitation 1 (1998) 55-62.

Zaady: "Microphytic soil . . . "; Ecology and Environment 5 (1999) 77-84.

Dody et al.: "Utilization of biological . . . ": International conference of Safety Radioactice Waste Disposal, IAEA, Tokyo, Japan (1 page).

Johansen J.R. et al. Recovery Patterns of Cryptogamic Soil Crusts in Desert Rangelands Following Fire Disturbance Bryologist. 1984.vol. 87, No. 3, pp. 238-243 ISSN 0007-2745 (6 pages).

Matthew A. Bowker et al., "Prioritizing Conservation Effort through the Use of Biological Soil Crusts as Ecosystem Function Indicators in an Arid Region", Conservation Biology, 2008, pp. 1-11 (11 pages).

Spanish search report and written opinion—6 pages, mailed May 17, 2010.

International Preliminary Report on Patentability for corresponding PCT application—5 pages—issued Nov. 13, 2007.

* cited by examiner

METHOD FOR PROMOTING SOIL CRUST FORMATION

CLAIM OF PRIORITY

This application claims priority as a 371 of international application serial number PCT/IL2006/000534, filed on May 4, 2006; which claims priority to Israeli patent application serial number 168527 filed on May 10, 2005.

FIELD OF THE INVENTION

The present invention relates to an environmentally friendly method for enhancing the formation or recovery of microfloral soil crust, particularly in disturbed or contaminated areas, by using runoff water collected in undisturbed sites. The method may be used to reduce the contamination of ground water from dump sites, and for decreasing the erosion of the cap layer.

BACKGROUND OF THE INVENTION

The vital importance of the microfloral soil crust for ecology in arid and semiarid regions of the world has now been well established (e.g. www.soilcrust.org), and since arid and semi-arid climates comprise over one quarter of the land area of earth (more than any other climate type), the crust is eminently important for the global climate and ecology The biogenic soil crust, known as biological soil crust or microphytic soil crust, being usually between 1 and 15 mm thick, and often covering up to 70% of the arid or semi-arid area, is inhabited predominantly by cyanobacteria, soil bacteria, algae, and lichens, which may be accompanied by mosses in more humid areas, the species composition varying from place to place [see e.g., Zaady, E. et al.: Soil Biol. Biochem. 32 (2000) 959-66]. Algae and cyanobacteria produce mucilaginous polysaccharides that seal the surface and form the crust.

The most important among the crust organisms are cyanobacteria, called also blue-green algae, organisms that have been present on the Earth for at least 3.5 billion of years, and have created the Earth's oxygen atmosphere. Cyanobacteria move through soil, and leave polysaccharide sheaths behind. The soil grains are glued together by said viscous polysaccharides secreted by cyanobacteria or green algae, and form a hard layer [Mazor G. et al.: FEMS Microbiology Ecology 21 (1996) 121-30]. Filamentous cyanobacteria, such as *Microcoleus* sp., are especially efficient in the crust formation in arid environments [Belnap J. and Gardner J. S.: Great Basin Naturalist 53 (1993) 40-7]. The soil particles are immobilized by being both glued to each other and entrapped in the web of fibers, wherein the cyanobacterial basis may be further strengthened by green algae, lichen species, or other plants, according to climate of the region [Zaady, E. et al.: Plant and Soil 190 (1997) 247-52]. From among lichens, which are algae or cyanobacteria symbiotically living with fungi, *Colema* may be named as a typical representative, important in microfloral crusts.

The crust layer may improve water hold-up by reducing its evaporation. The crust is involved in important ecological roles, including nitrogen fixation, preventing erosion, providing a first organic matter in the food chain, or affecting rain water runoff ratio [see, e.g., Zaady E. and Shachak M.: Amer. J. Botany 81 (1994) 109]. Although the crust is quite modest in some respects, not requiring more than 0.2 mm dew precipitation to keep photosynthesizing, it may be easily disturbed and damaged, e.g. by pushing, trampling by grazers, burning, or treating with herbicides, and its recovery may take from several to several dozens of years. An erosion, both by water and winds, are immediate results after the crust disturbance. In the United States alone, millions hectares have undergone some degree of wind erosion.

Several methods have been described for treating the areas with damaged soil crust. Small patches of heavily damaged soil may be recovered by scattering a sludge prepared by suspending 2-4 mm of upper layer of non-afflicted soil in water [St. Clair L. L. et al.: Reclam. Reveget. Res. 4 (1986) 261-9; Metting B.: Biological surface features of semiarid land and deserts. In Skujins, J., (Ed.), Semiarid lands and deserts, Soil resource and reclamation. Marcel Decker Inc., New York. (1991) pp. 257-93]. Transferring large volumes of soil from one place to another is a drawback of the method. Further, the method is invasive, damaging the site from which the soil is taken, especially in view of an estimation that about 75% photosynthetic biomass is produced in the top 3 mm of soil. Another method comprises spraying the soil with an algae suspension, prepared from laboratory cultures [e.g., Johansen J. R: Journal of Phycology 29 (1993) 140-7]. Disadvantages of the method comprise high costs of the cultures, and a danger of spreading species non-native to the treated environment. A still other method includes adding algal polysaccharides into the soil. However, the soil organisms feed on the saccharides, leading to their quick disappearance. U.S. Pat. No. 3,969,844 describes a method of conditioning soil by inoculating said soil with flocculant-producing algae, however all nutrients necessary for the growth of said algae must be continually maintained in said soil. U.S. Pat. No. 4,774,186 discloses the production of an algae powder, suspendible in water and sprayable on soil to improve its aggregation. U.S. Pat. No. 5,441,877 discloses a method for the vegetalization of bare terrain comprising applying a substrate consisting of an organic matter, synthetic polymer, and a clay inoculated with cyanobacteria and mosses. U.S. Pat. No. 6,228,136 discloses a method of aggregating soil, comprising inoculating a substrate material, such as a woven fabric, with cyanobacteria, and disseminating the substrate pieces in the soil. The latter method comprises identifying or isolating naturally occurring species of cyanobacteria in the intended area.

Finally, a method has been described, that comprises adding to the soil artificial stabilizers which glue soil particles together [Rubio H. O. et al.: J. Range Management 45 (1992) 296-300]. However, said method does not support the appearance of naturally occurring, crust-forming organisms. The appearance of these organisms depends on immission of the reproduction-ensuring material (further called propagules), originating in the undisturbed areas, that passively moves to disturbed areas and may germinate to establish a new crust, and a passive drift like that may be very slow.

It is therefore an object of the invention to provide a new method for enhancing the soil crust formation, comprising accelerating the colonization by microorganisms native to the treated environment.

It is still another object of the invention to provide a method for enhancing the soil crust formation without the necessity to identify or isolate the species of the involved microorganisms.

It is yet another object of the invention to provide a method for enhancing the soil crust formation in a target region, said method being non-invasive, avoiding damaging the soil crust in another region, and avoiding disseminating any biological or chemical material not endemic to the target region.

The new method should accelerate the crust formation, and should support rehabilitation efforts in arid or semiarid areas, or in a disturbed region, i.e. in a region that underwent any crust disturbance. This invention also aims at providing a method for enhancing the formation of the soil crust in an area that is contaminated or potentially contaminated with environmentally undesired materials, since the absence of the soil crust layers may be the main reason for spreading contaminations from dumps, waste disposal sites, or otherwise littered or contaminated areas. It is therefore a further object of the invention to slow down or to prevent said spreading.

Many methods have been developed for containing hazardous materials, and for reducing their spreading into the environment from dump sites, including concrete layers, mineral layers, plastic layers, etc., wherein said site is separated either from adjacent soil or also from adjacent air by various interfaces. WO 90/14222 describes a method of preventing migration of hazardous wastes to the environment, comprising a leakproof composite layer consisting of a mineral layer and a flexible sheet. U.S. Pat. No. 5,090,843 discloses a seal layer covering a waste disposal site, comprising a layer of mineral, such as calcium carbonate, and a layer of soil above said mineral layer. The seal layer is intended to prevent the migration of water into or out of a waste material. The materials used for isolating the dump sites from the adjacent environment have limited stabilities, and it is desirable that the soil adjacent to said dump site, as well as the soil eventually used in isolating said dump site, have reduced permeability to water, particularly to rain water, that may be the main factor in spreading hazardous materials from the dump sites to the environment.

It is therefore a further object of the invention to stabilize the surface of the soil in dump sites, or the soil in the vicinity of dump sites, in order to reduce or prevent a leakage of contaminants from said site into the environment. The term leakage or spreading, as used herein, comprises transmission of environmentally undesired materials from contaminated areas to uncontaminated or less contaminated areas by surface water, by groundwater, or by wind.

It is a still further object of the invention to stabilize the soil surface in contaminated areas, or near contaminated areas, using organisms naturally occurring in the environment of the treated area.

It is also an object of the invention to stabilize the soil surface in contaminated areas, or near contaminated areas, wherein the contamination originates from the waste disposal site, or from unwanted leakage.

It is also another object of the invention to enhance the crust formation in the soil that separates the predominantly contaminated area from the predominantly unaffected area.

Other objects and advantages of present invention will appear as description proceeds.

SUMMARY OF THE INVENTION

The present invention provides a method for enhancing the soil crust formation, comprising steps of i) collecting overland runoff water from the surface of the soil (source soil) on a first site (source site), which source soil is covered with a microfloral crust, thereby obtaining a suspension that contains microfloral propagules enabling the germination of the crust microflora; ii) optionally modifying the concentration of said propagules in said suspension from the previous step; and iii) applying said propagules onto the soil (target soil) at a second site (target site), which target soil lacks a microfloral crust or is covered by a crust less developed than the crust on said source soil, wherein said source site and said target site are in the same geographical and climate region; thereby accelerating the colonization of said target soil by microorganisms native to the environment. As a skilled person knows, a biogenic crust can be easily assessed, both from the viewpoint of the layer thickness, and richness of organisms, by considering a prima facie morphology or eventually utilizing simple routine techniques, so that it will be easy to compare two microfloral crusts.

In a preferred embodiment of the invention, the method for enhancing the soil crust formation further comprises processing said propagule suspension before said applying onto the soil, aimed at improving the efficiency of the method. The propagule suspension may be filtered, concentrated, stabilized, and adjusted to a required appearance or consistence. The method of the invention may comprise concentrating said suspension that contains microfloral propagules by evaporation before applying said propagules onto the soil, or said method may comprise drying said suspension that contains microfloral propagules, thereby obtaining a propagules powder. The propagules powder may be resuspended in water before the intended use in creating, renewing, or enhancing the microfloral soil crust, or before the use in stabilizing the soil. Said resuspending may be facilitated by the presence of agents, known in the art, that support wetting and suspending. Such agents may be admixed to a propagules suspension before drying, or to water in which a propagules powder should be resuspended.

In a preferred embodiment of the invention, after collecting said runoff water and obtaining a propagules suspension, said suspension is applied onto a target site directly. In another preferred embodiment, after collecting said runoff water and obtaining a propagules suspension, said suspension is concentrated, preferably by evaporation, and only then is the propagules suspension applied onto said target site. In a still another preferred embodiment, after collecting said runoff water and obtaining a propagules suspension, said suspension is diluted with water and then applied onto a target site.

The term propagule, as used herein, encompasses biological material having the capacity to multiply or to give rise to a new whole organism under suitable conditions, leading to the reproduction of the relevant species, wherein the species included in the crust population, as described herein, include at least one representative of cyanobacteria, and usually include a variety of species. A nonlimitative example of a propagule is a spore or a cell. In the method of the invention, the propagules are applied into the soil in an aqueous suspension, which may optionally comprise other components improving the efficacy of the method.

The propagules may be applied onto the soil together with other materials which may affect the efficiency of the method, or which may affect the aesthetic properties of the propagules suspensions or powders. The propagule suspension may contain biologically active agents, such as selective, growth supporting or growth inhibiting, factors. In a preferred embodiment, the propagules are applied together with at least one material selected from inhibitory agents, agents affecting consistency or appearance of the propagules suspension that is applied, and agents limiting the mobility of said propagules after applying them onto the soil. Said inhibitory agents may, for example, comprise a pesticide, non-photosynthetic herbicide, fungicide, insecticide, and their mixtures. Said agents limiting the propagules mobility may comprise a material capable of polymerization or gelation after applying it onto the soil, or a material affecting the viscosity of the propagules suspension, etc. In one embodiment, said material is mixed with said suspension of propagules before applying onto the soil. In another embodiment, said material is applied onto the soil separately from the propagules, and may contact the propagules shortly before applying said propagules onto the soil, or during or after applying the propagules onto the soil. Said material preferably comprises a polymeric agent or a polymerizable agent. Said polymeric agent preferably forms a film attached to the soil after applying said propagules onto the soil. Said film is preferably porous, and does not interfere with the biological activities of the important organisms contributing to the microfloral crust. An example of a suitable polymeric agent to be used in a method of the invention, is a styrene-acrylic copolymer, or other sprayable plastic polymer. In a preferred embodiment, a thin layer of about 5-100 µm is attached to the soil and immobilizes the reproduction particles of said microflora, as well as the soil particles, at least for the time necessary for germination of the relevant organisms.

In the method of the invention, runoff water is collected, that contacted the soil surface with well developed microfloral crust, wherein said runoff water may be formed by raining. Said runoff water may be artificial flow or flood. Surplus water is collected at the bottom of an inclined area or in drainage conduits or furrows, using passive movement of water caused by the gravitation, or any other suitable method, such as pumping water from the surface of the source site. If the source site is horizontal, water is brought to it, and after suitable period of time is sucked off, and used for inoculating the target site. A suitable drainage system may enable to collect more efficiently the propagule suspension; of course, said drainage preferably causing minimal disturbance to the soil. Said propagule suspension is in fact an environmentally friendly, natural, inoculum; it is applied on the target soil preferably by uniformly scattering it onto, or over, the whole surface of said target site. Said artificial flow or flood preferably does not damage microfloral crust on said source site from which the water is collected. Said runoff water may be pumped from the source site to containers.

In one aspect, the invention relates to enhancing the soil crust formation, and to the rehabilitation, recultivation, reclamation or revegetation of the soil in a humid zone or in a dry zone, such as an arid or semiarid area, or in a disturbed region or in an area that has been afflicted by a disturbing event, such as an event destroying or damaging or weakening the biogenic soil crust.

In another aspect, the invention relates to enhancing the soil crust formation, and to the stabilization of the soil in a contaminated area. The method of the invention is used for treating the soil in contaminated areas, in order to reduce permeability of the soil to water, and thereby reducing potential contamination of ground water. The invention thus provides a method for enhancing the soil crust formation in contaminated areas, or near to contaminated areas, and thereby stabilizing the soil surface of such contaminated areas, or locations adjacent to them, said method comprising i) collecting runoff water from the surface of the soil (source soil) on a first site (source site), which source soil is covered with a microfloral crust, thereby obtaining a suspension that contains microfloral propagules; ii) optionally modifying the concentration of said propagules in said suspension from the previous step; and iii) applying said propagule suspension onto the soil (target soil) at a second site (target site), which target site is situated in a contaminated area, or in the vicinity of a contaminated area, which area is in the same geographical and climate region as said source soil; thereby accelerating the colonization of said target soil by microorganisms native to the environment and stabilizing the soil surface in said contaminated area, or in the vicinity of said contaminated area, and reducing or preventing spreading of environmentally undesired materials from said contaminated area to the ground water. The method of the invention may comprise steps that enable to change the concentration of the propagules in the used suspension. Said steps may lead to concentrating said suspension that contains microfloral propagules, for example by evaporation before applying said propagules onto the soil. In a preferred embodiment of the invention, most of the water is removed from the propagules suspension, and a powder is obtained, that contains microfloral propagules. A propagules suspension may be diluted with water before applying onto the soil. In the method of the invention, for enhancing the soil crust formation in contaminated areas or in the vicinity of such areas, the propagules suspension may be applied onto the soil together with at least one material selected from agents affecting consistency or appearance of said aqueous suspension, inhibitory agents, and agents limiting the mobility of said propagules after applying them onto the soil. Said contaminated area may comprise a dump or a waste disposal site. The contamination in said area may originate from an incidental or accidental leakage. In a preferred embodiment of the invention, the soil that is treated in order to enhance its biogenic crust serves as a cover, or as a cap layer, or is a component of layers serving as a cover, that overlays a hazardous or environmentally undesirable material. The method of the invention is preferably used for enhancing the formation of the microfloral crust on the soil which covers hazardous material, or on the soil which separates essentially contaminated area from essentially unaffected area. The propagule suspension may be processed before applying onto the soil, wherein said processing may comprise at least one item selected from filtration, evaporation, dilution with water, and admixing a material selected from agents affecting consistency or appearance, inhibitory agents, and agents limiting the mobility of said propagules in the soil.

This invention also directed to the propagule suspension for use in enhancing the soil crust formation, which suspension comprises runoff water collected from the surface of soil covered with a microflora of the crusts, and contains reproduction-ensuring material of said microflora. This invention is further directed to said propagule suspension for use in stabilizing the soil surface in a contaminated area, or in the vicinity of a contaminated area. Said propagule suspension may be used together or with a material selected from agents affecting consistency or appearance of said suspension, inhibitory agents, and agents limiting the mobility of said propagules after applying them onto the soil, such as a styrene-acrylic copolymer.

In one aspect, the invention relates to a propagules powder that may be used in enhancing the soil crust formation. The propagules powder may be resuspended in water, or suitable water based solution or suspension or emulsion, before the intended use. A method is provided by this invention, for preparing a propagule powder, comprising steps of i) collecting runoff water from the surface of the soil covered with a microfloral crust, thereby obtaining a suspension that contains microfloral propagules; ii) optionally admixing to said suspension obtained in the previous step a material selected from agents facilitating resuspending dried powders in water, agents affecting consistency or appearance of powders, and agents limiting the mobility of said propagules after applying them onto the soil; and iii) evaporating said suspension at temperatures from 20 to 50° C. A propagule powder is provided by the invention obtained by the above said method.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

Figure 1:
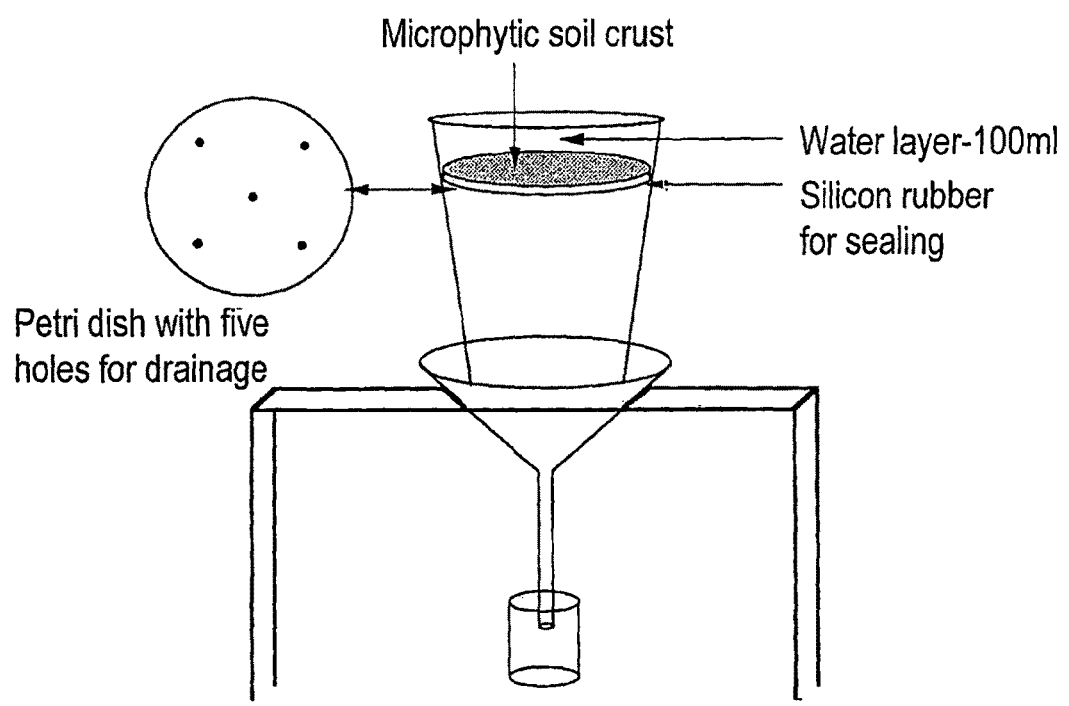
FIG. 1. demonstrates the technique used for measuring a layer penetrability characterizing water volume passed through a layer against time.
Figure 2:
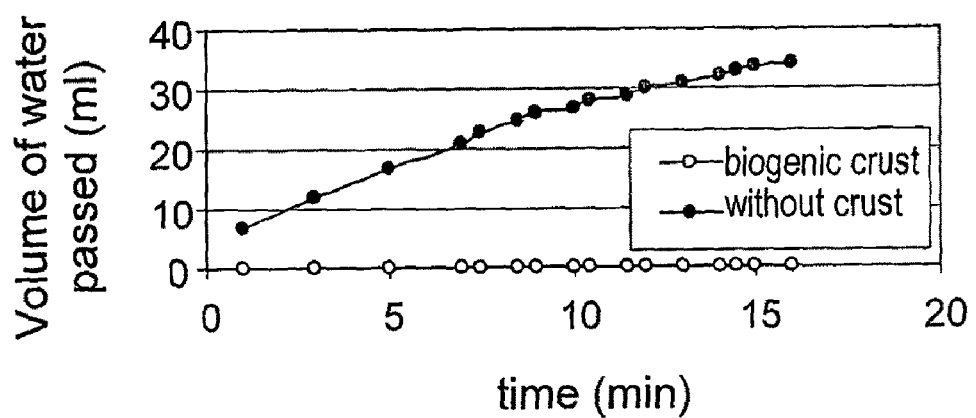
FIG. 2. compares the penetrability for water of two sand soils, one with and one without the biogenic crust.
Figure 3:
FIG. 3. is a photo showing a filament web in the soil of cyanobacterial origin.

It has now been found that a water runoff collected from a site with a developed microfloral soil crust may be used in a surprisingly efficient method for enhancing the soil crust formation in a site where the crust is less developed or is missing. The experiments were done in the semiarid region of the Northern Negev, Israel. Said runoff water may be either naturally occurring water flow, such as rain water, or artificially surface drainage or wash water that was intentionally used to produce overland water flow over developed soil crust.

Without committing themselves to any particular theory, the inventors suggest that runoff water, after contacting a biogenic soil crust, contains reproduction-ensuring material, also called propagules herein, that enables the germination of the microorganisms contributing to the soil crust formation, including cyanobacteria, and, depending on the washed site, possibly also algae, lichens, and other organisms such as mosses and fungi. Propagules may comprise dormant or living cells, heterocysts, akinetes, cell colonies or colony fragments, spores, cyanobacteria and lichen fragments, moss protonema or other forms that may give rise to reproducing organisms contributing to biogenic soil crusts.

In order to check preferred ways of utilizing the above finding, and the method of the invention, the inventors examined how the organisms, useful for soil stabilization, were spreading under the conditions of the Northern Negev via water and air ways. Rainwater runoff and dust were checked for the content of particles involved in the reproduction of the relevant microorganisms. For this purpose, stations were established for collecting dust, and experimental plots were reserved for collecting and creating/collecting streams of overland water flows. Further, experimental plots were established, some initially having the crust and some initially lacking the crust, for studying the effects of the method of this invention on enhancing the biogenic crust on soils. The propagules suspension prepared and applied according to the invention was proved, in the experiments, to be an efficient way how to enhance or recover the microfloral soil crust.

The invention thus relates to a method of creating or recovering a soil crust on a site where a biogenic crust is missing, or where a thicker crust is desirable. In a preferred embodiment of the invention, runoff water that was in contact with soil having a well developed biogenic crust in a first site (the source site) is used for treating the soil with a less developed crust in a second site (target site), not far from the first site, with an objective to enhance the crust formation or recovery on the second site. Not being far from each other means that the two sites belong to the same geographical and climate region. Said treating means contacting said wash water with the target soil, for example by spraying said water over the target site, but without comprising forces that might destroy the biological potential of propagules.

The enhancement of the soil crust formation in said target region is achieved without detrimental removal of biogenic layer from the source site, and without detrimental introduction of non-native species to the target region. In a preferred embodiment of the invention, in a landscape near to the target site, a site is located having well developed biogenic crust, and a slow flow of water is allowed to wash the source site, the wash water being then collected, and subsequently used for dispersing onto the target site. Said flow preferably leaves the source crust essentially undamaged.

By enhancing the soil crust, the invention provides means for soil stabilization. In one aspect of the invention, said stabilization enables to slow down erosion and desertification, and to support recultivation, reclamation and rehabilitation efforts in arid or semiarid areas, or in a disturbed region. In another aspect of the invention, said stabilization enables to reduce the soil permeability in contaminated areas, reducing the contamination of ground water with environmentally undesired materials.

Said contaminated area may comprise dump site, waste disposal sites, or other littered or contaminated area, or area afflicted by an incidental leakage of a hazardous material. In a preferred embodiment of the invention, the soil used for covering a hazardous material is treated with propagule suspension, thereby lowering the permeability of the soil surface, and reducing potential leakage of hazardous contaminants into the ground water caused by rains. Said propagule suspension is obtained by washing soil surface having well developed microfloral crust with water. In another preferred embodiment, the crust formation is enhanced in the soil that separates a substantially contaminated area from a substantially unaffected location, thereby reducing the contamination of ground water in the locations adjacent to the primarily contaminated areas, from which the contamination may spread horizontally by surface water flow or by wind to the neighboring locations.

Said propagule suspension may comprise normal living cells, reproductive forms, dormant forms, spores, etc., and its species composition varies according to the geographical, climatologic, seasonal, or other ecological conditions. However, the method of the invention does not essentially require any species characterization, since it relates to inoculating the soil by samples obtained near to the target sites, without respect to their compositions, and is applicable to all environments in which microfloral soil crust is pertinent. A skilled person understands that a propagule suspension may comprise species belonging among cyanobacteria, soil bacteria, protozoa, fungi, algae (comprising, e.g., diatoms and green algae), lichens, and mosses, even though only some of the species are important for soil stabilization. Some species, such as *Microcoleus* sp. occur more generally, others are typical only for certain regions. Thus, more types of soil crusts may be discerned, such as algal crust, cyanobacterial-algal crust, cyanobacterial-lichen crust, etc. Nevertheless, the method of the invention is quite universal, and independent on the type of the crust.

Runoff water after contacting the soil crust may be collected by using the gravitation under a sloped site or in a drainage furrow, or by using a sucking device. In one embodiment of the invention, said runoff water is rain water. In another preferred embodiment of the invention, the source site is washed by water artificially, wherein the water is poured on the site carefully, employing minimal flow rates and minimal forces, so as not to disturb the existing crust. Overland runoff water may be collected in the flume. A flexible hose connected to a vacuum pump may be attached to the lower end of the flume, and a pump will feed the collected water into a container. The pump may be activated automatically when ponding occurs, further comprising crude filters, and other means to ensure the effective collection of active propagules.

The collected runoff water subsequently serves as a propagule suspension for treating a site on which the enhancement of microfloral crust is desired. For dispersing propagule suspensions, the means used for dispersing liquid manure may be used, or other means suitable for spraying or showering liquids on the soil surfaces, provided that the conditions are not destructive for the propagules. A skilled person will know which species, and which reproductive cells, are the most important in the working region, and accordingly will not employ such mechanic, temperature, or chemical conditions that might damage or weaken the species. However, in view of unusual stability of most species which may be relevant in the biogenic crusts, such as cyanobacteria, no special precautions are generally necessary, except for avoiding high pressurized spraying, that might mechanically damage the cells, for example by shear forces or by sharp pressure changes.

A propagule suspension may be obtained, for example, by washing 100 $m^2$ of soil, on which a well formed biogenic crust exists, with 1 $m^3$ of water. Water collected from 100 $m^2$ may be used for recovering the crust, or for enhancing the crust formation, on an area typically of from 100 to 1000 $m^2$. Of course, more concentrated suspension will have stronger enhancing effect. For example, concentrating the collected original overland water runoff by native evaporation of the accumulated water, and thus removing up to 80% water, simplifies the manipulations. The complete removal of water from the propagules suspension provides a propagules powder, which has obvious advantages from the viewpoint of manipulation and distribution, but in addition to that, it enables to store the propagules for a future use nearly without any limits due to a high stability of the propagules. By washing 1 $m^2$ of the soil, followed by filtering on a 500 μm filter and drying, about 1 to 10 grams of propagules powder may be obtained, depending on the conditions, wherein a substantial part of the mass may be attributed to soil particles.

An agent is preferably used together with the propagules suspension, which affects, for example, the mobility of the propagules in the soil. In some embodiments, solidification or viscosity increase occur after applying the suspension onto the soil, thereby slowing down the flow of the suspension off an inclined surface, and immobilizing propagule and soil particles. In a preferred embodiment of the method according to the invention, runoff water from soil covered with microfloral crust is collected, and applied together with a component capable to create a thin layer or film, attached onto the soil. The layer helps to immobilize the reproduction particles at least until their germination. Said agent may comprise a polymer, such as a polysaccharide. Said agent may comprise a monomer or oligomer, that is capable of polymerizing after applying the mixture on the target soil, eventually producing gel or solid layer. Said layer is preferably non-toxic and degradable, and enables to keep the propagule in the target site until they start to reproduce.

In one preferred embodiment of the invention, the propagule suspension is applied together with a polymer that hardens on the soil, by evaporation of water, and provides a semi-flexible porous film. A suitable polymer is provided, for example, by Soil Mulch Products Israel Ltd., under the name Ecotex. Ecotex is a sprayable plastic polymer used broadly in agriculture for the cost-effective creation of thin plastic films on large areas [Gamliel A. et al.: Soil solar disinfection by spraying dissolves membrane with formalin, disinfestations of damage in field crops and improving crop and quality. Institutes for Agriculture Engineering and Soil and Water, Agriculture Research Organization, Ministry of Agriculture. Report for 1998-1999, pp. 32; Gamliel, A.: Solartex, Solar cover for soil disinfestations. Institute for Agriculture Engineering, Agriculture Research Organization, Ministry of Agriculture, I-V (2001)]. Ecotex is an environmentally safe mixture containing an aqueous styrene-acrylic copolymer emulsion which hardens after applying onto the soil. It may be applied in amounts as low as 10 $g/m^2$, forming a porous film of 10 μm, which keeps its integrity and slowly degrades into harmless substances.

A propagule suspension may be produced, for example, by washing 100 $m^2$ of soil on which a well formed biogenic crust exists, with 1 $m^3$ of water, which is collected and sprayed onto 100 $m^2$ of a target site, while applying on that surface 1 kg of Ecotex.

The invention provides a method for reducing or preventing the leakage of detrimental materials from a contaminated site, such as waste disposal sites or sites afflicted by a chemical or radioactive contamination in an accidental events, comprising at least the steps of i) collecting runoff water from a source soil which is covered with well developed microfloral crust, wherein said source soil is near to said contaminated site, thereby obtaining propagule suspension, and ii) applying said propagules, in the form of water suspension, onto soil in said contaminated site or in the vicinity of said contaminated site.

By enhancing the crust formation, the method of the invention may stabilize the soil in a contaminated site, wherein said soil is possibly used to cover hazardous materials according to various known disposal methods. Said stabilization reduces or prevents washing of hazardous contaminants into the ground water by rains. The method of the invention may also be used to stabilize the soil in the vicinity of a contaminated site, which soil separates an essentially contaminated area from an essentially uncontaminated area.

A skilled person is aware that the biogenic soil crust, when once developed, may get thicker also due to dust immission, still more enhancing the protecting effect of the crust [Offer Y. Z. et al.: Arid Soil Research and Rehabilitation 1 (1998) 55-62]. It is understood, that a skilled person may modify the method of the invention, aimed at soil stabilization, without essentially departing from the claimed invention, by taking into consideration conditions varying from region to region, as well as variables related to the waste that is involved, etc. Although in most cases no special knowledge is necessary for applying the method of the invention, in some cases additional information or knowledge may help in improving the efficiency of the method according to the invention. Thus, e.g., a skilled person realizes that as pH of soils decreases, natural populations in the crusts comprise more diatoms and green algae, and less cyanobacteria; when a specific toxin against certain microorganism may appear in a target site, propagules not based on that microorganism will be selected if possible; etc.

The invention will be further described and illustrated in the following examples.

EXAMPLES

General Procedures

In the present research, thirty plots with and without the crust were established, 1 $m^2$ each, for collecting rainwater runoff, subjected to chemical and biological analysis. The research examined how the organisms useful for soil stabilization spread, including water and air ways. Dust and rain water runoff was checked for the content of propagules of the organisms. For this purpose, stations were established for collecting dust, and experimental plots were reserved for collecting surface water, whether rain water or artificially created flows. Dust collecting stations, four installations for detecting dust drift by wind, were protected from any interference, and once in month the collector contents were checked and taken to granulometric, chemical, and micromorphologic analysis. Two habitats were chosen, the first with sandy surface, and the second was characterized with mixed silt, clay and sand surface. In each habitat 15 plots were constructed were surplus overland water runoff was collected: 5 plots with natural biogenic crust, 10 plots were the crust was removed by scraping, exposing the natural subsurface. Further, in each habitat 5 plots were used as a reference and 5 were sprayed with surface water runoff. PVC and plastic materials were used to construct barriers between the plots in order to allow chemical and biological analysis.

In controlled laboratory conditions, *Microcoleus vaginatus* showed the growth rate of about 2.6 $cm^2$/day [Zaady E.: Ecology and Environment 5 (1999) 77-84]. The penetrability of soil layers to water was characterized in a laboratory model by a flow-through experiment, in which a perforated Petri dish with a microphytic soil crust was placed to and sealed in a 100 ml vessel, as shown in FIG. 1, and the volume that passed was measured as a function of time. It was found, that the presence of the microfloral crusts that were collected randomly from the research sites, about 10 mm thick, slowed the flow rate 10 times when compared to soil without crust.

The mechanical and chemical properties of the soil surfaces were characterized as described [Zaady E. and Bouskila A.: J. Arid Environ. 50 (2002) 235-46]. The crust formation is accompanied by increased surface resistance, which may be measured by penetrometry, and by increased content of proteins, chlorophyll and polysaccharides. Further, $CO_2$ exchange, as indicator of the crust biological activity, was measured [Zaady E. et al.: Soil Biol. Biochem. 32 (2000) 959-66].

The experiments have demonstrated that the plots, treated by the method of the invention, were characterized by more stable soil surfaces, further also exhibiting all the biophysiological parameters typical for well developed microfloral crust.

While this invention has been described in terms of some specific examples, many modifications and variations are possible. It is therefore understood that within the scope of the appended claims, the invention may be realized otherwise than as specifically described.

The invention claimed is:

1. A method for promoting soil crust formation, comprising steps of:
    i) collecting overland runoff water from the surface of the soil (source soil) on a first site (source site), which source soil is covered with a microfloral crust, thereby obtaining a suspension that contains microfloral propagules;
    ii) optionally modifying the concentration of said propagules in said suspension from the previous step:
    iii) applying said propagules onto the soil (target soil) at a second site (target site), which target soil lacks a microfloral crust or is covered by a microfloral crust less thick or rich in microorganisms that the crust on said source soil, wherein said source site and said target site are in the same geographical and climate region;
    thereby promoting the colonization of said target soil by microorganisms native to the environment.

2. A method according to claim 1, comprising concentrating said suspension that contains microfloral propagules by evaporation before applying said propagules onto the soil.

3. A method according to claim 1, comprising drying said suspension that contains microfloral propagules, thereby obtaining a propagules powder.

4. A method according to claim 3, comprising resuspending said propagules powder in water.

5. A method according to claim 3, comprising adding to said suspension before drying an agent that facilitates resuspending dried propagules in water.

6. A method according to claim 1, comprising diluting said suspension that contains microfloral propagules with water.

7. A method according to claim 1, comprising applying an aqueous suspension of said propagules onto the soil, wherein said suspension of propagules further comprises at least one material selected from the group consisting of agents affecting consistency or appearance of said aqueous suspension, inhibitory agents, and agents limiting the mobility of said propagules after applying them onto the soil.

8. A method according to claim 7, wherein said material is mixed with said suspension of propagules before applying onto the soil.

9. A method according to claim 7, wherein said material is applied onto the soil separately.

10. A method according to claim 7, wherein said material comprises a polymeric agent or a polymerizable agent.

11. A method according to claim 10, wherein said agent forms a film attached to the soil after applying said propagules onto the soil.

12. A method according to claim 11, wherein said film is a porous film.

13. A method according to claim 10, wherein said material comprises a sprayable plastic polymer.

14. A method according to claim 7, wherein said inhibitory agent selectively inhibits the growth of undesired organisms.

15. A method according to claim 1, wherein said overland runoff water is formed by raining.

16. A method according to claim 1, wherein said overland runoff water is formed by an artificial flow or flood.

17. A method according to claim 1, comprising soil rehabilitation, recultivation, reclamation or revegetation in a disturbed region.

18. A method for promoting soil crust formation according to claim 1, comprising:
    i) collecting runoff water from the surface of the soil (source soil) on a first site (source site), which source soil is covered with a microfloral crust, thereby obtaining a suspension that contains microfloral propagules;
    ii) optionally modifying the concentration of said propagules in said suspension from the previous step;
    iii) applying said propagule suspension onto the soil (target soil) at a second site (target site), which target site is situated in a contaminated area, or in the vicinity of a contaminated area, which area is in the same geographical and climate region as the source soil;
    thereby promoting the colonization of said target soil by microorganisms native to the environment and stabilizing the soil surface in said contaminated area or in the vicinity of said contaminated area, and reducing or preventing spreading of environmentally undesired materials from said contaminated area to ground water.

19. A method according to claim 18, wherein said area is a dump or a waste disposal site.

20. A method according to claim 18, wherein said area is contaminated by a leakage of a contaminant during an environmental accident.

21. A method according to claim 1 for promoting soil crust formation, wherein said soil covers an environmental contaminant.

22. A method according to claim 1 for promoting soil crust formation, wherein said soil separates contaminated area from unaffected area.

23. A method according to claim 1, further comprising processing said propagule suspension before applying it onto the soil, wherein said processing comprises at least one item selected from filtration, evaporation, dilution with water, and admixing a material selected from agents affecting consistency or appearance, inhibitory agents, and agents limiting the mobility of said propagules in the soil.

24. A method of preparing a propagule suspension comprising collecting runoff water from the surface of soil which is covered with a microflora crust, containing reproduction-ensuring material of said microflora.

25. A propagule powder obtained by drying the suspension of claim 24 at a temperature of from 20 to 50° C.

* * * * *